3,700,466
METHOD OF MAKING COFFEE EXTRACT

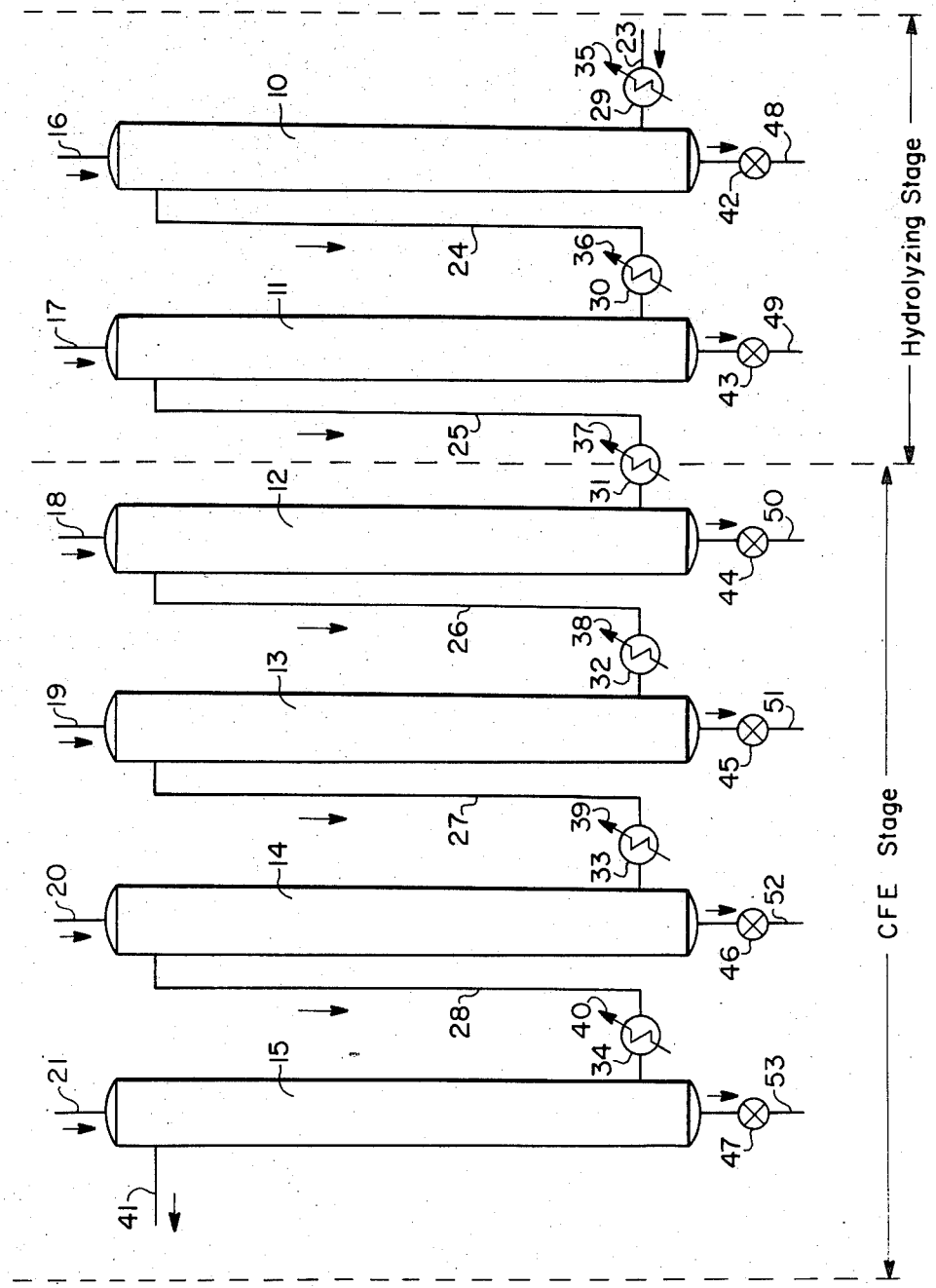

Robert J. Bergeron, Springfield Township, Hamilton County, and Stephen L. Schlichter, Green Township, Hamilton County, Ohio, assignors to The Procter & Gamble Company, Cincinnati, Ohio
Continuation of abandoned application Ser. No. 779,711, Nov. 29, 1968. This application Mar. 15, 1971, Ser. No. 124,454

Int. Cl. A23f 1/08
U.S. Cl. 99—71          9 Claims

ABSTRACT OF THE DISCLOSURE

A method of preparing soluble coffee extract which comprises a two-stage counter-current extraction wherein one stage is a hydrolyzing stage and is operated at temperatures of from 330° to 355° F. and wherein the other stage is a cold, fresh extraction stage operated at temperatures of from 32° to 180° F. and at a pressure of not less than about 200 p.s.i.g.

---

This is a continuation of application Ser. No. 779,711 filed Nov. 29, 1968, and now abandoned.

BACKGROUND OF THE INVENTION

It is known in the art of soluble coffee production that certain advantages are to be gained by a cold extraction process. For example, as early as 1880 Gue et al. U.S. Pat. 228,889 disclosed a cold extraction process. While cold extraction processes give an advantage in preserving easily escapable volatiles there are a number of disadvantages accompanying cold extraction processes. For example, the amount of solubles obtained is quite low which results in less soluble coffee being obtained per pound of roast and ground coffee. Additionally, if the process employed is a conventional counter-current extraction process such as is disclosed in Sivetz, Coffee Processing Technology, 1963 edition, vol. 1, p. 262, which is incorporated herein by reference, the use of a very low extraction temperature results in an increased viscosity of the extract liquor making passage through a bed of coffee grounds extremely difficult. This often results in high backup pressure and clogging which necessitates a shutdown of the system.

Like cold extraction processes, very high temperature counter-current extraction processes also result in certain advantages and disadvantages. The principal advantage is that at high temperatures, for example above 300° F., much more soluble material can be obtained from any specific quantity of roast and ground coffee. The primary reason for this increased solubility is that at high temperatures the coffee undergoes hydrolysis which results in more soluble material. For a good discussion of hydrolysis of coffee see Sivetz, Coffee Processing Technology, 1963 edition, vol. 1, pp. 351 through 360, which is incorporated herein by reference. While such high temperature hydrolysis processes result in a higher concentration of solubles, many valuable volatile aroma characteristics are lost during the extraction.

The prior art is replete with disclosures on methods for improving the taste of instant coffee. Most of these disclosures improve coffee flavor but sacrifice yield or time. There are a few patents which relate to regulating the temperature of the extraction liquor as it passes through the extraction system in order to give a specific temperature profile designed to increase the number of desirable flavors. See, for example, Guggenheim U.S. Pat. 2,915,399, Clinton U.S. Pat. 2,915,403, and Bowden U.S. Pat. 3,089,722. While the temperature profiles disclosed in these patents produce good flavor extracts, they give yields of coffee which are generally less than about 35% by weight of the roast and ground coffee in the extraction system. Additionally, while the prior art does disclose a two-section counter-current extraction system comprising a hot section and a cold section (see Guggenheim U.S. Pat. 2,915,399), the method disclosed in this invention utilizes higher temperatures in the "hot section" of the counter-current extraction train, and utilizes lower temperatures in the "cold section" of the counter-current extraction train than does the prior art. Additionally, the method disclosed in this invention utilizes higher pressures than those taught by the prior art. The critical combination of higher temperatures in the hydrolysis stage, lower temperatures in the cold, fresh extraction stage and maintaining a high pressure throughout the cold, fresh extraction stage results in higher yields and unexpected flavor improvements not taught or suggested by the prior art.

It has now been found that a two-stage counter-current extraction process using carefully controlled temperature and pressure conditions will give an extract which will combine most of the essential advantages of cold temperature extraction and high temperature extraction without the usual accompanying disadvantages.

Accordingly, an object of this invention is to produce an extract of coffee which when dried and dissolved in water at beverage strength gives a coffee beverage which is substantially indistinguishable from a fresh brew of such coffee.

A more detailed object is to provide an improved method for extracting the flavor, aroma, and solid ingredients from roasted and ground coffee without deleteriously affecting these constituents so that the extracted ingredients, upon dilution to a beverage, yield a fresh brew-like beverage.

Still another object of this invention is to provide an improved method for securing a high concentration of coffee solubles in a coffee extract liquor without deleteriously affecting and degrading the important flavor and aroma principles of the product.

Still another important object of the invention is to produce by a commercially feasible and economically sound process a substantially improved instant coffee by a method which can be carried out in existing equipment; thus avoiding the necessity to purchase expensive additional equipment.

Other objects and advantages will become apparent from the following description.

SUMMARY OF THE INVENTION

This invention relates to the production of instant coffee and more particularly to an improved counter-current extraction process in which the coaction of temperatures and pressures carefully controlled within critical limits produce higher yields of coffee solubles which are characterized by being substantially free of off-flavor notes and having an unexpected enhancement in flavor quality.

More specifically, this invention relates to a counter-current extraction train which is divided into two stages. The first stage is a hydrolyzing stage wherein the temperature is maintained within the range of 330° to 355° F., and the second stage is a cold, fresh extraction stage wherein the temperature is maintained at from 32° to 180° F. Throughout the cold, fresh extraction stage of the extraction train, the pressure is maintained at not less than about 200 p.s.i.g.

As noted above, the invention relates to an improvement in a conventional counter-current extraction process. Counter-current extraction is a term used in the coffee art to describe a process of extraction wherein fresh water is entered into one end of a plurality of connected percolating (extraction) columns and wherein the water passes through one column to another and is successively contacted by progressively fresher coffee grounds. The last column contains the freshest coffee grounds. The process is conducted semi-continuously in a counter-current manner so that the fresh liquor (water) entering the system at one end becomes continually more concentrated with dissolved coffee solids as it contacts progressively fresher coffee grounds in successive percolators. Each percolator is initially filled with a bed of fresh coffee grounds and when the content of solubles in the bed of the first column (that percolator containing the most exhausted coffee grounds) has been fully hydrolyzed and extracted, that percolator is disconnected from the system and the spent or exhausted coffee grounds are withdrawn and discarded. Simultaneously, or more commonly just before the spent column grounds are withdrawn, a fresh filled percolator is placed on the stream as a new column in the series of percolators at the opposite end of the percolator series from that end where the spent grounds column is being withdrawn from the system.

It is usual in a counter-current extraction process that the most spent coffee grounds be contacted with high temperature water, for instance, about 300° F. in an effort to extract as much soluble matter as possible. This higher temperature section of the extraction train causes hydrolysis of a portion of the coffee grounds thereby effecting the dissolving of a higher amount of coffee solids. For purposes of description and convenience, that portion of the extraction train in which the hydrolysis reactions take place, and in which high temperatures are employed, will hereinafter be referred to as the hydrolyzing stage.

Further, for purposes of convenience and description, columns of the extraction train not a part of the hydrolysis stage as above defined will hereinafter be referred to as the cold, fresh extraction stage CFE stage). It is to be understood that the artificial labeling of the two stages as a hydrolyzing stage and a CFE stage is not to be taken as limiting this invention but merely as convenient labeling for descriptive clarity.

More specifically, this invention relates to an improvement in a counter-current extraction process wherein coffee grounds are contacted by extraction liquor in a hydrolyzing stage and a subsequent cold fresh extraction stage and the finished coffee extract is withdrawn from the cold fresh extraction stage, the improvement comprising:

(1) Maintaining the temperature in the hydrolyzing stage of said extraction process within the range of 330° to 355° F.; and (2) Maintaining in the cold, fresh extraction stage of said extraction process a temperature within the range of from about 32° to about 180° F. and a pressure at not less than about 200 p.s.i.g.

DRAWING

In order to illustrate the process of this invention, a preferred method of operation will be described in connection with the single figure of the drawing which illustrates a schematic flow sheet of one embodiment according to which the process can be conducted.

DETAILED DESCRIPTION

In the commercial production of soluble coffee, extract liquor is passed through multiple percolator or extraction columns (these terms are used interchangeably herein) containing roast and ground coffee to produce an aqueous extract. The extraction liquor continually flows in series through a plurality of columns, entering at the bottom of a column containing the most nearly spent coffee, exiting at the top of this column and thereafter passing in similar fashion through the columns of progressively fresher coffee. Periodically( for example about every 30 minutes) extract is withdrawn from the column containing the freshest coffee. When essentially all of the water solubles in the roast and ground coffee in the most nearly spent coffee column have been extracted and a portion of the coffee solids have been hydrolyzed, the column is disconnected from the system; the coffee grounds are discharged and the column is refilled with fresh roast and ground coffee. When the column is disconnected from the system a standby column containing fresh coffee is cut into the system at the opposite end of the extraction train.

The column from which the extract is withdrawn from the system is hereinafter referred to as the last coffee column; it contains the fresher coffee. The phrase "first coffee column" is hereinafter used to designate the column where the extraction liquor is first introduced into the system; it contains the most nearly spent coffee. As explained above, in the summary of the invention for purposes of description and clarity those columns in which hydrolysis reactions take place, primarily because of the high temperatures employed (from about 330° to 355° F.), are referred to as the hydrolysis stage. Those columns where the extract liquor is subjected to much lower temperature conditions (from about 32° to 180° F.) are referred to as the CFE stage.

The number of columns in a counter-current extraction system can be varied from about 5 to about 16. A typical extraction train more often than not will consist of six columns; therefore, for purposes of description only, the following description will refer to a six column extraction train. It should be understood, however, that the use of a six column train in the following description is merely illustrative of one embodiment of this invention. The number of columns used may be easily increased or decreased. Thus, the number of columns used in any particular stage is not a limiting feature of this invention.

In accordance with this invention, a highly concentrated extract of coffee solubles is obtained by a counter-current two stage extraction system consisting of a hydrolyzing stage and a CFE stage. Each of these stages can be characterized and defined by the temperatures prevailing herewithin as hereinafter described in detail.

Before explaining the process of this invention in more detail and in order to more fully explain the principle of counter-current extraction the following description is presented with reference to the attached drawing which illustrates a flow-sheet of one embodiment according to which this process can be conducted. Various modifications and changes can be made in the apparatus and the drawing and the following description are illustrative only and offered merely for descriptive purposes.

In the drawing six percolators or extraction columns 10, 11, 12, 13, 14, and 15, are shown. Each percolator contains therewithin a screen (not shown) at the bottom thereof and a suitable screening device (also not shown) positioned in the upper part of the percolator whereby coffee grounds are prevented from being carried out of the bed by the upflowing extraction liquor. Each percolator has at its upper end a charge line 16, 17, 18, 19, 20, and 21, schematically shown, through which fresh charge coffee is admitted to the percolator. The lower portion of each of the percolators is fitted with a coffee discharge or blow-down line 48, 49, 50, 51, 52, and 53, through which coffeee may be removed from the column when the appropriate blow-down valve 42, 43, 44, 45, 46 or 47 is opened.

Each percolator has a liquid inlet line 23, 24, 25, 26, 27, and 28, leading to the lower portion thereof. Each of the percolators is also fitted with a liquid outlet line leading from the top thereof. The outlet line from each percolator connects directly with, and is numbered the same as, the inlet line to the next succeeding percolator, whereby as liquid flows respectively through percolators 10, 11,

12, 13, 14, and 15, it passes through lines 23, 24, 25, 26, 27, 28 and is discharged from the system through line 41.

Each percolator is fitted with a heat exchanger 29, 30, 31, 32, 33 and 34, which can be an intra-columnar heat exchanger, but preferably as shown in the drawing, it will be positioned in the liquid inlet lines 23, 24, 25, 26, 27 and 28 just before said inlet lines enter the percolators 10, 11, 12, 13, 14, and 15. Each heat exchanger is provided with a heat exchange fluid line 35, 36, 37, 38, 39, and 40, through which appropriate heat exchange medium, e.g. cooling water or steam is hereinafter described, can be passed to modify the temperature of liquid before it is admitted to the percolator. During a particular sequence of operations some of the heat exchangers are not necessarily employed.

In the drawing, the coffee columns (percolators) have been designated by numbers 10 through 15. In describing the liquid flow through the system, reference will occasionally be made herein to the first percolator and when such reference is made, percolator 10 is referred to.

Those columns designated by numbers 10 and 11 are labeled the hydrolyzing stage. The hydrolyzing stage is defined as that stage of extraction system in which hydrolysis of the coffee extract takes place and is further characterized by the high temperature employed. It is essential to the process of this invention that the temperatures within the hydrolyzing stage be maintained within the range of 330° to 355° F. This temperature range has been found to be essential because it optimizes conditions for maximum yield and flavor enhancement. If temperatures substantially in excess of 355° F. are used in the hydrolyzing stage there is a marked tendency for over hydrolyzing to take place which effects a degradation of the coffee grounds resulting in off-flavors and destruction of valuable flavor enhancing volatiles. Moreover, at temperatures substantially above 355° F., pressure problems are also caused by the degraded grounds compacting in the columns. For these reasons temperatures within the hydrolyzing stage should not be above 355° F.

The lower temperature limitation for the hydrolyzing stage is 330° F. It has been found that if the temperature within the hydrolyzing section is allowed to fall much below 330° F. that yields of product are decreased substantially making operation of the process less economical.

Reference is made to U.S. patent application, Ser. No. 603,718, filed Dec. 22, 1966, Hair et al., entitled "Coffee Extraction Process," a commonly assigned application now abandoned which relates to the 330° to 355° F. controlled temperatures in the hydrolysis stage.

The temperature of the roast and ground coffee and the extraction liquor in any given column in a coffee extraction system is not in a steady state. The temperature of the grounds and extract liquor within any specific column may be varying constantly within the prescribed temperature range. Accordingly, the temperature set forth in the specification and claims in any given column or stage is the prevailing temperature at the inlet to the column or stage at the moment before the most nearly spent coffee column (i.e. column 10 in the drawing) is removed from the extraction system.

The required hydrolyzing stage temperatures of this invention are most conveniently maintained by the use of intercolumn heat exchangers such as those designated in the drawing by numbers 29, 30, 31, 32, 33 and 34. In lieu of intercolumn heat exchangers the temperature can be maintained within the prescribed range by the use of jacketed columns. Both intercolumn heat exchangers and jacketed columns are well known in the coffee extraction art and a detailed description of their operation is not required.

The pressure within the hydrolyzing stage of the extraction system need not be as carefully controlled as the pressure within the CFE stage. For example, the pressure in the hydrolyzing stage can be as low as about 150 p.s.i.g. which is a conventional pressure often employed in counter-current extraction processes. Alternatively, if desired, the pressure within the hydrolyzing stage can be maintained at the same level as the pressure within the CFE stage which, as explained in detail below, should be kept at a pressure of not less than about 200 p.s.i.g. If the pressure within the hydrolyzing stage is maintained at a lower level than the pressure within the CFE stage, it will be readily apparent to those skilled in the art that between the last column of the hydrolyzing stage and the first column of the CFE stage (in the drawing between those columns designated by numbers 11 and 12) there will have to be a pressure increasing device connected to the system, for example a pump.

In the attached drawing, those columns designated by numbers 12, 13, 14, and 15 are labeled as the CFE stage. It is essential that the temperature within the CFE stage be maintained within the range of from 32° to 180° F. Thus, in the process of this invention a substantial temperature drop occurs after the hydrolysis stage is completed. This temperature change may be effected by a heat exchanger, 37, interjacently positioned after the hydrolyzing stage prior to entry into the CFE stage. The above referred to temperature reduction can also be effected by means other than a heat exchanger. For example, the temperature reduction can be effected by natural convection. Thus the precise means of temperature reduction prior to entry into the CFE stage is not a limiting feature of this invention.

Maintaining the temperatures in the CFE stage within the range of 32° to 180° F. is essential to providing an extract product characterized by enhanced flavor characteristics. At temperatures much above 180° F. it has been found that the CFE flavor enhancement disappears and the extract takes on an off-flavor note which apparently destroys any advantages gained by the low temperature extraction. If the temperature used in the CFE stage is below 32° F. the yield of extract product becomes too low to make the process economical. Additionally, if temperatures below 32° F. are employed the extract becomes very viscous and results in a backup pressure throughout the entire system. This backup pressure, in turn, can result in clogging which will necessitate a shutdown of the entire process. From the standpoint of process efficiency a preferred CFE stage temperature range is 80° to 160° F.

It is essential that within the CFE stage of the counter-current extraction process that the pressure be maintained at not less than about 200 p.s.i.g. A preferred lower pressure limit is about 250 p.s.i.g. Maintaining the pressure at not less than about 200 p.s.i.g. is essentially to prevent clogging of the system by the cold and consequently more viscous extract. In short, because the temperatures are so low in the CFE stage, higher pressures are needed to move the extract through the system; however, it has been surprisingly found that there are additional advantages to be gained by higher pressures in the CFE stage. For example, the higher pressures force additional volatiles into solution and give a slight flavor improvement. Because gases are always more soluble in cold liquids, low temperature operation allows for solubilization of more volatiles than operation at more conventional higher temperatures. The combination and coaction of higher pressure and low temperatures within the CFE stage results in smoother operation and optimum flavor accentuation. It is this critical combination of high pressure and low temperatures within the CFE stage that gives the unexpected and unique brew-like properties to the resultant soluble coffee product.

The practical upper pressure limit is that pressure that any specific extraction system can withstand. In general, pressures less than about 600 p.s.i.g. are employed. A preferred upper limit is about 400 p.s.i.g. No particular advantage is gained by running the process at pressures above 400 p.s.i.g., however, it can be done if desired.

The cycle time is defined as the time interval between successive draw-offs of extract liquor. This interval is generally from about 15 minutes to 65 minutes with about 30 minutes being a preferred cycle. The cycle time corresponds to the interval between other operating steps besides draw-off; for example, it also corresponds to the time interval between the exposure of coffee in one coffee column to hydrolysis, i.e. column 17, and the exposure of coffee in the next fresher column, i.e. column 18, to hydrolysis temperature.

The yield, concentration of solubles, and the cold, fresh flavor qualities can, to a limited degree, be varied by varying the draw-off ratio. The draw-off ratio is defined as the amount of extract withdrawn from the system during one cycle compared to the average weight of coffee in each of the individual columns. For example, if the average column weight of roast and ground coffee is 100 pounds and 200 pounds of extract is taken out of the system in each cycle, the draw-off ratio is 2.0:1. To maximize yield and flavor qualities it is preferred that a draw-off ratio of from about 1.5:1 to 2.1:1 be maintained. The yield is defined as the amount of soluble coffee obtained compared on a percent basis to the amount of fresh roast and ground coffee used.

Additional alterations may be made which nevertheless fall well within the scope of the process of this invention. For example, the column containing the freshest coffee, the column designated by number 15 in the attached drawing, can be pressurized by an inert gas prior to the beginning of the extraction. This has the advantage of further reducing the pressure drops across the columns. As another example of a minor variation still coming within the scope of the process of this invention, volatiles which have been pressured into solution because of the high pressures in the CFE stage, and which are often lost upon drawing off the extract, can be saved by pulling a vacuum through a cryogenic trap on the extract as it emits from column 15. The result is a vacuum, cold temperature distillation of volatiles occluded in the extract. These volatiles can then be added back to the extract with a resulting slight flavor enhancement. The use of such a pressure-driven distallation rather than a heat driven distillation removes the problem of thermal degradation of the volatile aroma constituents. Other minor variations will no doubt be apparent, however, as long as the process makes use of a hydrolyzing stage with the temperatures ranging from 330° to 355° F., and a CFE stage with temperatures ranging from 32° to 180° F., and a pressure of not less than about 200 p.s.i.g. in the CFE stage, the process falls within the scope of the invention herein disclosed.

After emission from the extraction train, the extract is preferably concentrated and thereafter dried to give the final instant coffee product. Extract concentration is described in detail in Sivetz, Coffee Processing Technology (1963) (vol. 2), pp. 19–20 and 48–50 which are incorporated herein by reference. Generally speaking, the extract is concentrated, i.e. water is removed, until the coffee solubles content is from about 45% to about 70% by weight. Concentration can be accomplished by vacuum evaporation, freeze concentration, flashing, and thin film evaporation. All of these techniques are shown and described in Sivetz. After concentration, the extract is dried. Extract concentrate drying is described in detail in Sivetz, Coffee Processing Technology, 1963 (vol. 1), chapters 11 and 12 which are incorporated herein by reference. Drying can be accomplished by spray drying, freeze drying or drum drying, all of which are described in detail in Sivetz. In one conventional spray drying method, the extract is spray dried to a moisture content of about 3.5% in a conventional six-foot by fifteen-foot spray dryer using the air inlet temperature of 470° F., an air outlet temperature of 200° F. and a nozzle pressure of 500 p.s.i.g.

While the process of this invention has been described with particular reference to extracting roast and ground coffee, it can be adapted to the extraction of whole coffee beans; additionally, while water is generally the liquid that enters the first column of the extraction train, 10, water containing a small proportion of extracted coffee solubles can also be used.

The following example is offered to illustrate but not limit the disclosed invention. For purposes of clarity and convenience of description the example is described with particular reference to the attached drawing.

EXAMPLE I

Extraction of coffee solubles was effected in the six column system set forth in the drawing. Each column which was 3 feet in length and 2 inches in diameter was originally charged with 20 pounds of ground roasted blended coffee.

When starting up an extraction system, a certain period of time is required to bring the system to equilibrium, i.e. to attain steady operating conditions. Under conditions which prevail during steady operation of the process feed water emitted through line 23 at a pressure of about 260 p.s.i.g. was heated by steam from line 35 and heat exchanger 29 to 335° F. This water was admitted to the hydrolyzing stage of the extraction train. The coffee grounds contained within the percolator 10 were nearly spent coffee grounds which had the major portion of their solubles extracted therefrom.

The extract was passed through line 24 to percolator 11 of the extraction train. No heat exchange was effected by 36 and 30. The inlet temperature for percolator 11 was 343° F. Here the extract passed upwardly through a bed of coffee grounds which were fresher than the coffee in percolator 10. From percolator 11 the extract passed through line 25 to heat exchanger 31, wherein it was cooled by water at 60° F. from line 37 to a temperature of 120° F. The cold extract liquor then entered the CFE stage by passing upwardly through percolator 12. The extract liquor left percolator 12 through line 26. Thereafter an inlet temperature of 105° F. the extract passed into percolator 13. The extract was then passed upwardly through the bed of coffee in percolator 13. From percolator 13 the extract liquor was then passed through line 27 into percolator 14. The inlet temperature into percolator 14 was 95° F. After passing in an upwards manner through the bed of coffee grounds contained in percolator 14, the extract entered and passed through line 28 into percolator 15. The inlet temperature of the extract going into percolator 15 was 85° F. No heating or cooling was accomplished by 32, 33, and 34.

Draw-off in line 41 from percolator 15 was at a temperature of 85° F. The cycle time of the extraction was 20 minutes. The draw-off ratio was 2.0. The percent of solubles extracted; i.e. concentration of solubles in the extract drawn off was 20%; the yield was 40%. Throughout the entire CFE stage comprising percolators 12, 13, 14 and 15 the pressure was maintained at not less than 250 p.s.i.g. by a back pressure cash value (not pictured in the drawing) positioned on line 41.

The finished extract drawn off from line 41 was concentrated by thin film vacuum evaporation until the coffee soluble content was about 50%. The concentrate was then spray dried to a moisture content of about 3.5% in a conventional six-foot by fifteen foot spray dryer using an air inlet temperature of 470° F., an air outlet temperature of 200° F. and a nozzle pressure of 500 p.s.i.g.

The instant coffee prepared as described above was reconstituted and sampled by an expert panel and found to possess a unique flavor quality in that it was sweeter, smoother, less acid and yet stronger than conventionally prepared instant coffee. Most of the panel preferred the CFE processed soluble coffee over conventionally processed soluble coffees.

What is claimed is:
1. In a counter-current extraction process wherein coffee grounds are contacted by extraction liquor in a hy- drolyzing stage and a subsequent cold fresh extraction stage and finished coffee extract is withdrawn from the cold fresh extraction stage, concentrated and dried; the improvement comprising:
  (a) maintaining the temperature in the hydrolyzing stage of said extraction process within the range of 330° F. to 355° F.; and
  (b) reducing the temperature of the extraction liquor between the hydrolyzing stage of said extraction process and the cold fresh extraction stage of said extraction process from within the range of 330° F. to 355° F. to within the range of from about 32° F. to about 160° F.; and
  (c) maintaining the temperature in the cold fresh extraction stage of said extraction process within the range of from about 32° F. to about 160° F. and a pressure of not less than about 200 p.s.i.g.; and
  (d) maintaining an extract draw-off ratio of from 1.5:1 to 2.1:1 with extract being withdrawn from the cold fresh extraction stage at time intervals of from about every 15 minutes to about every 65 minutes.

2. The process of claim 1 wherein the temperature in the cold, fresh extraction stage is from 80° to 160° F.

3. The process of claim 1 wherein the pressure in the cold, fresh extraction stage is maintained at not less than about 250 p.s.i.g.

4. The process of claim 1 wherein the pressure in the cold, fresh extraction stage is maintained within the range of from 250 p.s.i.g. to 600 p.s.i.g.

5. The process of claim 1 wherein the pressure in the cold, fresh extraction stage is maintained within the range of from 250 p.s.i.g. to 400 p.s.i.g.

6. The process of claim 1 wherein the temperature in the cold fresh extraction stage is maintained within the range of 80° F. to 160° F. and the pressure within the range of from 250 p.s.i.g. to 400 p.s.i.g.

7. The concentrated and dried product of the process of claim 1.

8. In a counter-current extraction process wherein coffee grounds are contacted by extraction liquor in a hydrolyzing stage and a subsequent cold fresh extraction stage and finished coffee extract is withdrawn from the cold fresh extraction stage, concentrated and dried; the improvement comprising:
  (a) maintaining the temperature in the hydrolyzing stage of said extraction process within the range of 330° F. to 355° F.; and
  (b) reducing the temperature of the extraction liquor between the hydrolyzing stage of said extraction process and the cold fresh extraction stage of said extraction process from within the range of 330° F. to 355° F. to within the range of from about 32° F. to about 180° F.; and
  (c) maintaining the temperature in the cold fresh extraction stage of said extraction process within the range of from about 32° F. to about 180° F. and a pressure of not less than about 200 p.s.i.g.; and
  (d) maintaining an extract draw-off ratio of at least 1.5:1 with extract being withdrawn from the cold fresh extraction stage at time intervals of from about every 15 minutes to about every 65 minutes.

9. The concentrated and dried product of the process of claim 8.

References Cited

UNITED STATES PATENTS

| | | | |
|---|---|---|---|
| 2,324,526 | 7/1943 | Morgenthaler | 99—71 |
| 2,515,730 | 7/1950 | Ornfelt | 99—71 |
| 2,915,399 | 12/1959 | Guggenheim et al. | 99—71 |
| 2,915,403 | 12/1959 | Clinton et al. | 99—71 |
| 3,089,772 | 5/1963 | Bowden et al. | 99—71 |
| 3,224,879 | 12/1965 | Di Nardo | 99—71 |
| 3,361,571 | 1/1968 | Nutting et al. | 99—71 X |
| 3,529,968 | 9/1970 | Hair et al. | 99—71 |

OTHER REFERENCES

Sivetz et al., Coffee Processing Technology, vol. I, 1963, pp. 267 and 339 (copy in Group 170).

FRANK W. LUTTER, Primary Examiner

W. L. MENTLIK, Assistant Examiner